(12) United States Patent
Hayasaka et al.

(10) Patent No.: US 11,543,807 B2
(45) Date of Patent: Jan. 3, 2023

(54) MOUNTING STATE INFORMING APPARATUS AND MOUNTING STATE INFORMING METHOD

(71) Applicant: Tokyo Electron Limited, Tokyo (JP)

(72) Inventors: Naoto Hayasaka, Miyagi (JP); Naoki Mihara, Miyagi (JP); Kouko Yumura, Miyagi (JP); Junsuke Hoshiya, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 712 days.

(21) Appl. No.: 16/599,350

(22) Filed: Oct. 11, 2019

(65) Prior Publication Data

US 2020/0117175 A1 Apr. 16, 2020

(30) Foreign Application Priority Data

Oct. 15, 2018 (JP) .............................. JP2018-194382

(51) Int. Cl.
*G05B 19/418* (2006.01)
(52) U.S. Cl.
CPC .................. *G05B 19/41875* (2013.01); *G05B 2219/32368* (2013.01); *G05B 2219/35012* (2013.01); *G05B 2219/37216* (2013.01)
(58) Field of Classification Search
None
See application file for complete search history.

(56) References Cited

U.S. PATENT DOCUMENTS 5,743,005 A * 4/1998 Nakao ................ H05K 13/0812
29/721
2021/0162600 A1 * 6/2021 Clever .................... B25J 9/1671

FOREIGN PATENT DOCUMENTS

JP 2013-016443 A 1/2013

* cited by examiner

*Primary Examiner* — Sean Shechtman
(74) *Attorney, Agent, or Firm* — Pearne & Gordon LLP

(57) ABSTRACT

A mounting state informing apparatus includes a database, an acquisition unit, a first specifying unit, a comparison unit and an output unit. The database stores information upon a mounting position and a direction of each of multiple components belonging to a processing apparatus. The acquisition unit acquires first appearance data, which is obtained by a 3D scanner, indicating a state of an appearance of the processing apparatus. The first specifying unit identifies the multiple components based on the first appearance data and specifies a mounting position and a direction of each of the identified components. The comparison unit compares the specified mounting position and the specified direction of each of the identified components with the information upon the mounting position and the direction stored in the database. The output unit is configured to output a comparison result obtained by the comparison unit.

16 Claims, 17 Drawing Sheets

MOUNTING STATE INFORMING APPARATUS AND MOUNTING STATE INFORMING METHOD

CROSS-REFERENCE TO RELATED APPLICATION

This application claims the benefit of Japanese Patent Application No. 2018-194382 filed on Oct. 15, 2018, the entire disclosure of which is incorporated herein by reference.

TECHNICAL FIELD

The various aspects and embodiments described herein pertain generally to a mounting state informing apparatus and a mounting state informing method.

BACKGROUND

In a manufacturing process for a semiconductor device, various processings are performed on a processing target object. As such a processing performed on the processing target object, there is known a processing using plasma (hereinafter, referred to as "plasma processing"). By using the plasma, a physical reaction and a chemical reaction upon the processing target object can be accelerated, so that the processing such as film formation or etching can be performed efficiently.

Patent Document 1: Japanese Patent Laid-open Publication No. 2013-016443

SUMMARY

In one exemplary embodiment, a mounting state informing apparatus includes a database, an acquisition unit, a first specifying unit, a comparison unit and an output unit. The database is configured to store therein information upon a mounting position and a direction of each of multiple components belonging to a processing apparatus. The acquisition unit is configured to acquire first appearance data indicating a state of an appearance of the processing apparatus. The first appearance data is obtained by a 3D scanner. The first specifying unit is configured to identify the multiple components belonging to the processing apparatus based on the first appearance data and configured to specify a mounting position and a direction of each of the identified components. The comparison unit is configured to compare the specified mounting position and the specified direction of each of the identified components with the information upon the mounting position and the direction of the corresponding component stored in the database. The output unit is configured to output a comparison result obtained by the comparison unit.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
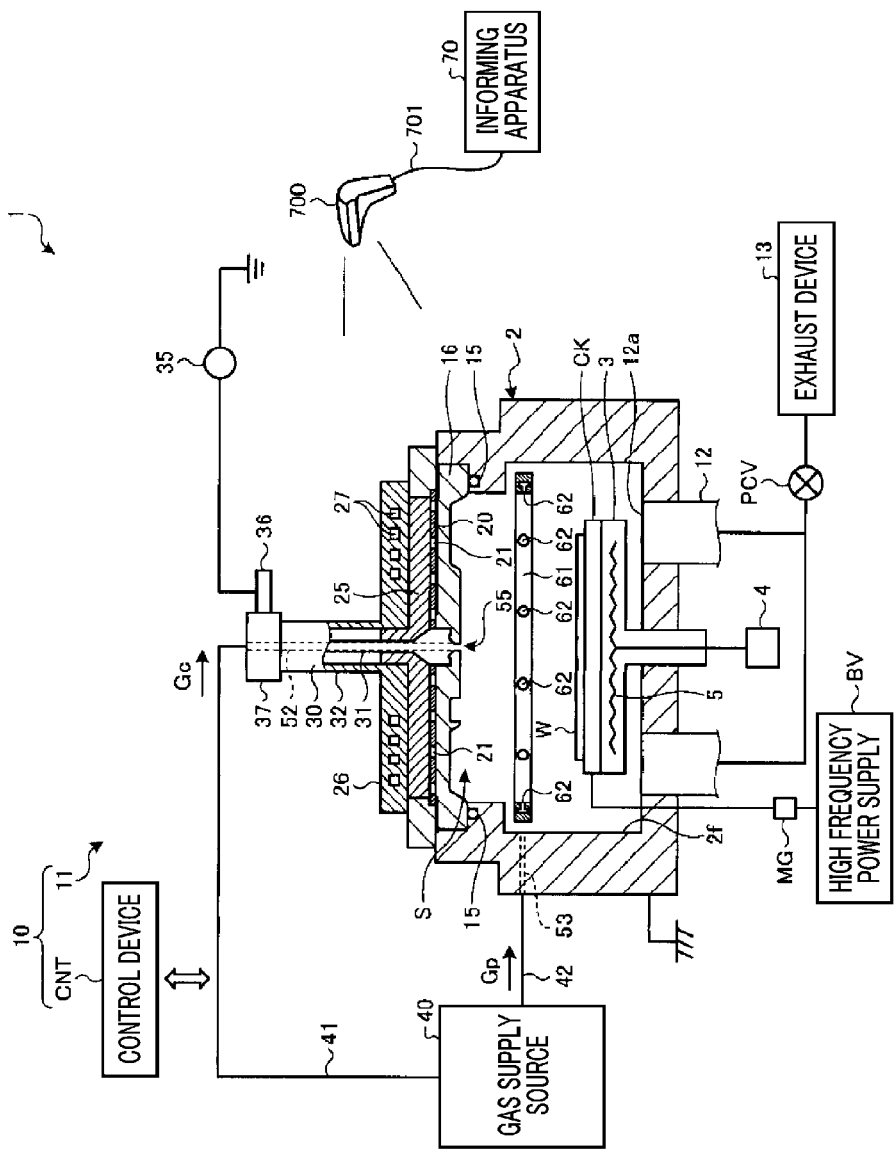
FIG. 1 is a diagram illustrating an example of a processing system according to a first exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, exemplary embodiments of a mounting state informing apparatus and a mounting state informing method will be described in detail with reference to the accompanying drawings. Here, however, it should be noted that the mounting state informing apparatus and the mounting state informing method of the present disclosure are not limited to the exemplary embodiments.

If a multiple number of processing target objects are processed in sequence by using a processing apparatus, a reaction byproduct (so-called a deposit) may adhere to the inside of the processing apparatus. Further, if the processing target objects are processed in sequence by using the processing apparatus, a component within the processing apparatus may be consumed (worn-out). For these reasons, maintenance is regularly performed. In the maintenance, the processing apparatus is disassembled, and the deposit adhering to the inside thereof is cleaned or the consumed component is replaced. If the cleaning or the replacement of the component is completed, the processing apparatus is assembled again, and then, the processing upon the processing target objects is performed.

However, there are size errors in individual components constituting the processing apparatus, and there is also an error in mounting the components. Thus, even if the processing apparatus is assembled again after the completion of the maintenance, positions and directions of the individual components may be subtly deviated from their original positions and directions in the processing apparatus before the maintenance. In such a case, if the processing upon the processing target object is performed, there may be a big difference between a processing result after the maintenance and a processing result before the maintenance.

If the difference between the processing result after the maintenance and the processing result before the maintenance exceeds a tolerance range, the processing apparatus needs to be assembled again. The processing result may not be obtained before the processing upon the processing target object is actually performed. For the reason, before the processing upon the processing target object is actually performed after the maintenance, it is difficult to determine whether the difference between the processing result after the maintenance and the processing result before the maintenance is within the tolerance range. It takes time to disassemble and assemble the processing apparatus and to perform the processing upon the processing target object. Thus, if the processing upon the processing target object and re-assembling of the processing apparatus are repeated, it will take time to return to a normal processing mode after the maintenance. As a result, the processing is delayed, and a throughput of the processing may be reduced.

In view of the foregoing, exemplary embodiments provide a technique of informing of a mounting state, thus capable of improving the throughput of the processing.

First Exemplary Embodiment

[Configuration of Processing System 1]

FIG. 1 is a diagram illustrating an example of a processing system 1 according to a first exemplary embodiment. The processing system 1 is equipped with a plasma processing apparatus 10 and an informing apparatus 70.

The informing apparatus 70 is connected to a 3D scanner 700 via a cable 701. The informing apparatus 70 specifies a position and a direction of each component mounted to the plasma processing apparatus 10 based on a three-dimensional image of the plasma processing apparatus 10 obtained by the 3D scanner 700. Then, the informing apparatus 70 compares the specified position and direction of each component with a reference position and a reference direction of each component of the plasma processing apparatus 10, and outputs a comparison result to a monitor or the like. Accordingly, a user of the plasma processing apparatus 10 can be informed of, if any, a deviation of the position and the direction of each component mounted to the plasma processing apparatus 10.

The plasma processing apparatus 10 includes an apparatus main body 11 and a control device CNT. The apparatus main body 11 is equipped with a substantially cylindrical processing vessel 2 made of, by way of example, but not limitation, aluminum. The processing vessel 2 is electrically grounded. A ceiling of the processing vessel 2 is closed by a dielectric window 16 which is made of a dielectric material. An inner wall surface of the processing vessel 2 is covered with an insulating protective film 2f such as, but not limited to, alumina.

A stage 3 is provided at a center of a bottom of the processing vessel 2. An electrostatic chuck CK is provided on a top surface of the stage 3 to place a processing target object W thereon. The electrostatic chuck CK is configured to attract and hold the processing target object W by static electricity. The electrostatic chuck CK is connected via a matching device MG to a high frequency power supply BV configured to apply a high frequency bias power.

The stage 3 is made of, by way of non-limiting example, alumina or aluminum nitride. A heater 5 is embedded in the stage 3, and the heater 5 is electrically connected to a heater power supply 4 via a wiring. The heater 5 is configured to generate heat by a power supplied from the heater power supply 4 and heat the processing target object W to a preset temperature through the electrostatic chuck CK.

A plurality of exhaust openings 12a is provided at the bottom of the processing vessel 2, and each exhaust opening 12a is connected to an exhaust device 13 via an exhaust line 12 and a pressure control valve PCV. An internal pressure of the processing vessel 2 is regulated to a preset pressure by the pressure control valve PCV and the exhaust device 13.

The dielectric window 16 is disposed at the ceiling of the processing vessel 2 with a seal member 15 such as an O-ring therebetween to secure airtightness. The dielectric window 16 is made of a dielectric material such as, but not limited to, quartz, alumina or aluminum nitride, and is microwave-transmissive.

A circular plate-shaped slot plate 20 is provided on a top surface of the dielectric window 16. The slot plate 20 is made of, for example, copper plated or coated with such a material having conductivity as gold or silver. For example, the slot plate 20 is provided with a multiple number of slots 21 which are arranged concentrically.

A dielectric plate 25 configured to shorten (compress) a wavelength of a microwave is disposed on a top surface of the slot plate 20. The dielectric plate 25 is made of a dielectric material such as, but not limited to, quartz, alumina or aluminum nitride. The dielectric plate 25 is covered with a conductive cover 26. Formed within the cover 26 is a path 27 into which a heat medium is supplied to be circulated therein. By controlling a temperature of the heat medium flowing in the path 27, the cover 26 and the dielectric plate 25 are adjusted to have a preset temperature.

A coaxial waveguide 30 configured to transmit the microwave is connected to a center of the cover 26. The coaxial waveguide 30 includes an inner conductor 31 and an outer conductor 32. The inner conductor 31 is connected to a center of the slot plate 20 through a center of the dielectric plate 25.

The coaxial waveguide 30 is connected to a microwave generator 35 via a mode converter 37 and a rectangular waveguide 36. The microwave generator 35 is configured to generate a microwave of, e.g., 2.45 GHz.

The microwave generated by the microwave generator 35 is transmitted to the dielectric plate 25 through the rectangular waveguide 36, the mode converter 37 and the coaxial waveguide 30. The microwave transmitted to the dielectric plate 25 is propagated to the slot plate 20 to be radiated into the processing vessel 2 from the multiple number of slots 21 of the slot plate 20 through the dielectric window 16. An electric field is formed under the dielectric window 16 by the microwave, so that plasma of a processing gas is generated in a processing space S between the dielectric window 16 and the processing target object W on the electrostatic chuck CK. In the present exemplary embodiment, the dielectric plate 25, the slot plate 20 and the dielectric window 16 constitute a RLSA (Radial Line Slot Antenna).

A central inlet 55 through which the processing gas is introduced to a central portion of the processing target object W is provided at the center of the dielectric window 16. A supply passage 52 through which the processing gas is supplied is formed in the inner conductor 31 of the coaxial waveguide 30. The central inlet 55 of the dielectric window 16 is connected to the supply passage 52 of the inner conductor 31. The processing gas supplied into the central inlet 55 from the supply path 52 is jetted into the processing space S toward the central portion of the processing target object W.

A ring-shaped peripheral inlet unit 61 configured to supply the processing gas into the processing space S is provided within the processing vessel 2 to surround the processing space S above the processing target object W. The peripheral inlet unit 61 is located between the processing target object W and the dielectric window 16 within the processing space S. The peripheral inlet unit 61 is made of a hollow pipe having a ring shape. Multiple peripheral inlet openings 62 are formed at an inner circumference surface of the peripheral inlet unit 61 at a regular distance therebetween in a circumferential direction. The processing gas is jetted from the peripheral inlet openings 62 toward a center of the peripheral inlet unit 61. The peripheral inlet unit 61 is made of, by way of non-limiting example, quartz.

Provided at a lateral side of the processing vessel 2 is a supply line 53 made of stainless steel. The supply line 53 is formed through a sidewall of the processing vessel 2. The supply line 53 is connected to the peripheral inlet unit 61. The processing gas supplied into the peripheral inlet unit 61 from the supply line 53 is jetted toward an inside of the peripheral inlet unit 61 from the multiple peripheral inlet openings 62 after being diffused in an internal space of the peripheral inlet unit 61. The processing gas jetted from the multiple peripheral inlet openings 62 is supplied to above a peripheral portion of the wafer W. Further, instead of providing the ring-shaped peripheral inlet unit 61, the multiple peripheral inlet openings 62 may be formed at an inner side surface of the processing vessel 2.

A gas supply source 40 is configured to supply the processing gas into the inner conductor 31 of the coaxial waveguide 30 via a pipeline 41. Further, the gas supply source 40 is configured to supply the processing gas into the supply line 53 via a pipeline 42. The gas supply source 40 is capable of controlling a ratio between a flow rate Gc of the processing gas supplied into the processing vessel 2 via the inner conductor 31 of the coaxial waveguide 30 and a flow rate Gp of the processing gas supplied into the processing vessel 2 via the peripheral inlet unit 61 and the supply line 53.

Figure 2:
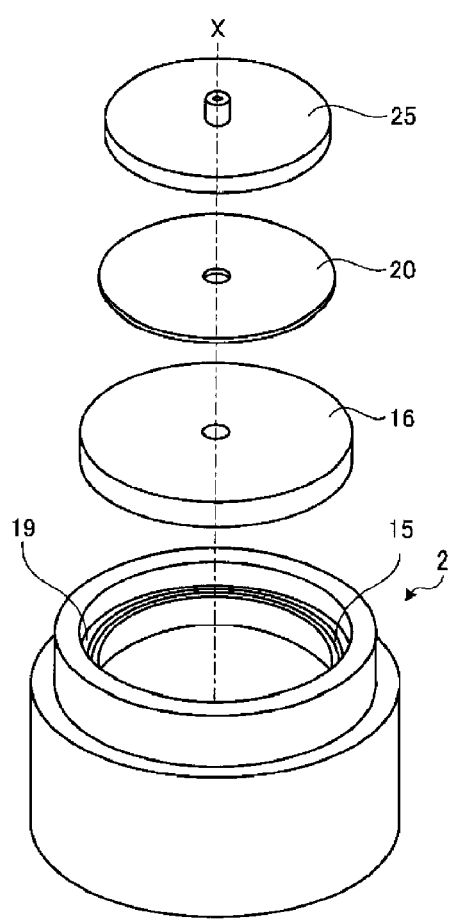
FIG. 2 is an exploded perspective view illustrating an example of a slot plate and components nearby.

FIG. 2 is an exploded perspective view illustrating an example of the slot plate 20 and components nearby. Though the slot plate 20 is provided with the multiple number of slots, illustration of those slots is omitted in FIG. 2. A bottom surface of the dielectric window 16 is mounted to the processing vessel 2 by being placed on a surface of an annular member 19 which forms a part of the sidewall of the processing vessel 2. The slot plate 20 is disposed on the top surface of the dielectric window 16, and the dielectric plate 25 is placed on top of the slot plate 20. The dielectric window 16, the slot plate 20 and the dielectric plate 25 have circular shapes when viewed from the top. The dielectric window 16, the slot plate 20 and the dielectric plate 25 are assembled such that central axes thereof are coincident. In the present exemplary embodiment, when the dielectric window 16, the slot plate 20, the dielectric plate 25 and the processing vessel 2 are assembled, the central axes of the dielectric window 16, the slot plate 20 and the dielectric plate 25 coincide with a central axis X of the cylindrical processing vessel 2.

Figure 3:
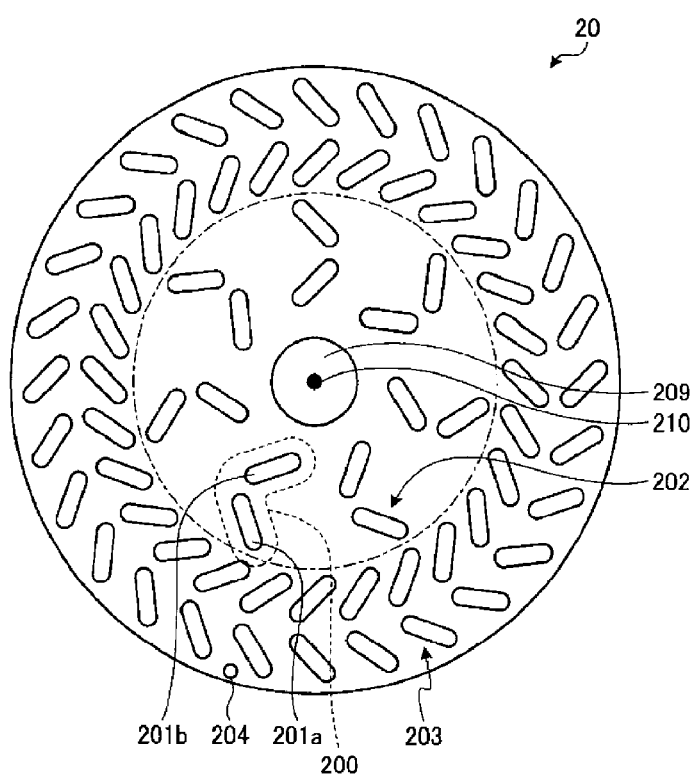
FIG. 3 is a plan view illustrating an example of the slot plate.

FIG. 3 is a plan view illustrating an example of the slot plate 20. The slot plate 20 has a circular plate shape. An opening 209 through which the processing gas flows is formed at the center of the slot plate 20. Both surfaces of the slot plate 20 in a plate thickness direction are flat. The slot plate 20 has a multiple number of slot pairs 200 formed through the slot plate 20 in the plate thickness direction. Each slot pair 200 includes a slot 201a elongated in a direction and a slot 201b elongated in a direction orthogonal to the slot 201a. These neighboring slots 201a and 202b form the single slot pair. To elaborate, the two slots 201a and 201b belonging to each slot pair are arranged to form a substantially L-shape with a cut-off center. In the example shown in FIG. 3, the slot pair 200 is surrounded by a dashed line.

On the surface of the slot plate 20, the slot pairs 200 are arranged at a regular distance therebetween on circles centered around a central axis 210 of the slot plate 20. In the slot plate 20 according to the present exemplary embodiment, the slot pairs 200 are arranged on two concentric circles having different radiuses. In the following, the slot pairs 200 arranged on a circle having a short radius will be referred to as an inner slot group 202, and the slot pairs 200 arranged on a circle having a long radius will be referred to as an outer slot group 203. In the example of FIG. 3, the inner slot group 202 is provided at an inside of an imaginary circle indicated by a dashed dotted line, and the outer slot group 203 is provided at an outside of the imaginary circle indicated by the dashed dotted line.

A reference hole 204 is provided at an outer region of the outer slot group 203 to ease positioning of the slot plate 20 in the circumferential direction. The reference hole 204 is formed through the slot plate 20. Accordingly, positioning of the slot plate 20 with respect to the processing vessel 2 and the dielectric window 16 in the circumferential direction can be carried out. The slot plate 20 has rotation symmetry with respect to the central axis 210 except for the reference hole 204.

Figure 4:
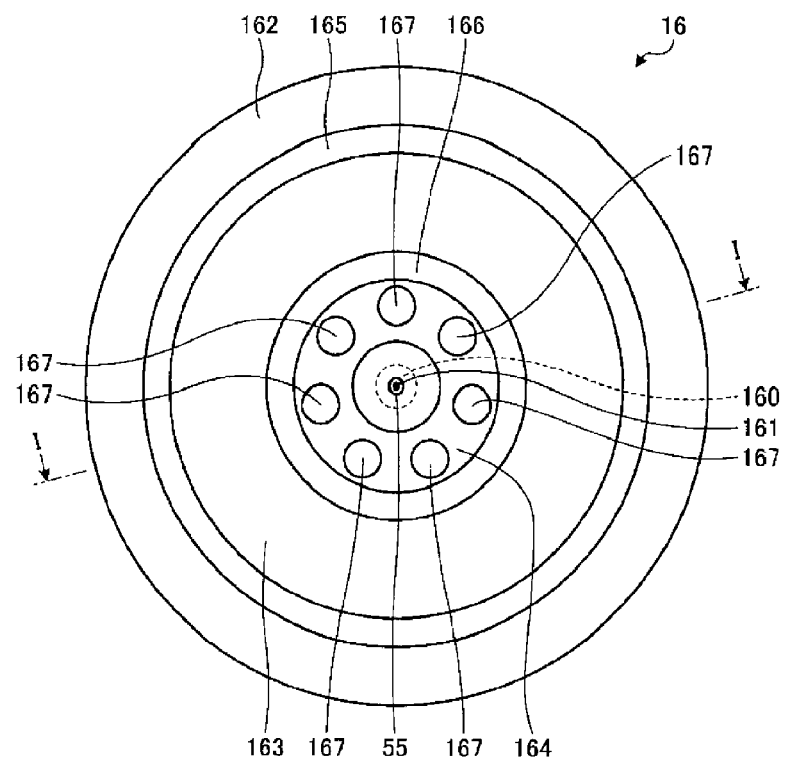
FIG. 4 is a plan view illustrating an example of a dielectric window seen from a processing space.
Figure 5:
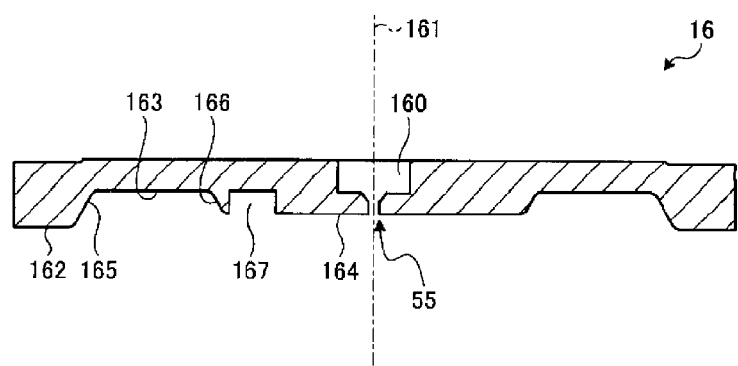
FIG. 5 is a diagram illustrating an example of a cross section of the dielectric window taken along a line I-I of FIG. 4.

FIG. 4 is a plan view illustrating an example of the dielectric window 16 seen from the processing space S. FIG. 5 is a diagram illustrating an example of a cross section of the dielectric window 16 taken along a line I-I of FIG. 4.

The dielectric window 16 has a circular plate shape. A recess 160 is formed at a center of a surface of the dielectric window 16 opposite from a surface facing the processing space S, and the central inlet 55 is formed at a center of the recess 160. The central inlet 55 is formed through the dielectric window 16 in a plate thickness direction. The surface of the dielectric window 16 facing the processing space S includes an outer region 162, an intermediate region 163 and an inner region 164. The intermediate region 163 of the dielectric window 16 is thinner than the outer region 162 and the inner region 164 of the dielectric window 16. A tapered portion 165 is formed between the outer region 162 and the intermediate region 163, and a tapered portion 166 is formed between the intermediate region 163 and the inner region 164.

A plurality of recesses 167 is formed at the inner region 164. Each recess 167 has a cylindrical shape. These recesses 167 are arranged at a regular distance therebetween along a circle centered around a central axis 161 of the dielectric window 16.

Here, the microwave transmitted to the dielectric plate 25 is propagated to the dielectric window 16 from the multiple number of slots provided at the slot plate 20. For example, the microwave propagated to each slot pair 200 belonging to the inner slot group 202 is then propagated to the corresponding recess 167 formed at the inner region 164 of the dielectric window 16. Accordingly, an electric field of the microwave can be concentrated to the surface of the recess 167 facing the processing space S, and a strong mode fix can be carried out at the inner region 164 of the dielectric window 16. Therefore, even if a processing condition is changed, a mode change in the inner region 164 can be suppressed, so that stable and uniform plasma can be generated, and uniformity of the processing can be improved.

Figure 6:
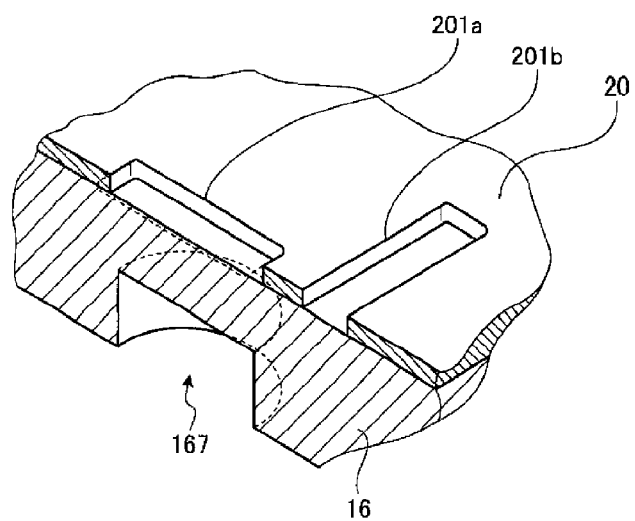
FIG. 6 is a perspective view illustrating an example of a slot, a recess and a vicinity thereof.
Figure 7:
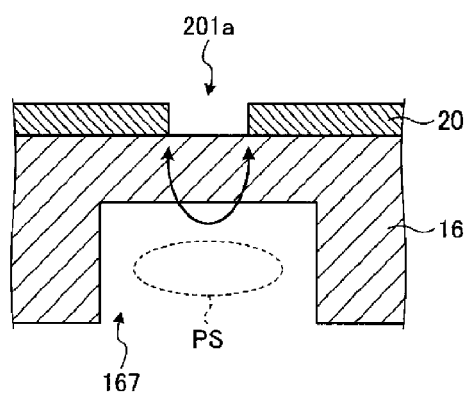
FIG. 7 is a cross sectional view illustrating the slot, the recess and the vicinity thereof.

FIG. 6 is a perspective view illustrating an example of the vicinity of the slot 201a, and the recess 167. FIG. 7 is a cross sectional view illustrating the example of the vicinity of the slot 201a and the recess 167. As depicted in FIG. 6, for example, if the microwave is supplied in the configuration in which the slot 201a is located directly above the recess 167, plasma PS is generated within the recess 167, as illustrated in FIG. 7, by an electric field generated in a width direction of the slot 201a.

Figure 8:
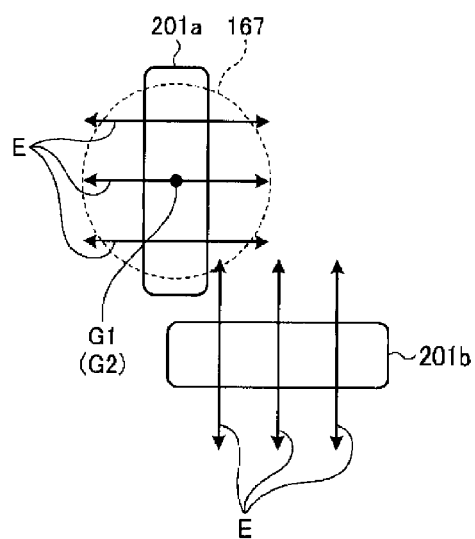
FIG. 8 is a diagram illustrating an example of a positional relationship between the slot and the recess.
Figure 9:
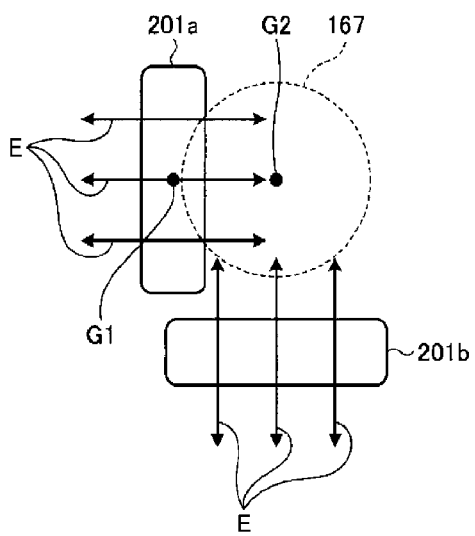
FIG. 9 is a diagram illustrating another example of the positional relationship between the slot and the recess.

FIG. 8 and FIG. 9 are diagrams illustrating examples of a positional relationship between the slots 201a and 201b and the recess 167. Electric fields E are generated in the width direction of the slot 201a and in a width direction of the slot 201b by the microwave propagated to the slot plate 20. FIG. 8 illustrates an example where a center position G1 of the slot 201a and a center position G2 of the recess 167 are coincident. In this case, since the plasma is securely fixed within the recess 167, fluctuation of the plasma is small, and an in-surface variation of the plasma can be suppressed even if various kinds of conditions are changed.

FIG. 9 illustrates an example where the center position G2 of the recess 167 is distanced apart from the center positions of the slots 201a and 201b. In this case, it gets difficult for the microwave to enter the recess 167. Accordingly, as it is difficult to increase intensity of the microwave radiated to below the recess 167, a density of the plasma under the recess 167 decreases. As a result, there may occur fluctuation in the generation of the plasma.

Since the dielectric window 16 faces the processing space S in which the plasma is generated, the dielectric window 16 may be consumed by the plasma or a reaction by-product may adhere to the dielectric window 16. For the reason, maintenance is regularly performed to separate the dielectric window 16 to clean or replace it. After the maintenance, the dielectric window 16 and the slot plate 20 are re-assembled, and then, the processing is resumed.

There is a size error in each of the components of the plasma processing apparatus 10 such as the dielectric window 16, and there is also an assembling error in assembling each of these components. Thus, even if the plasma processing apparatus 10 is re-assembled after the completion of the maintenance, the positions and the directions of the components may be subtly deviated from their original positions and directions in the plasma processing apparatus 10 before the maintenance. As stated above, since the plasma state is varied based on the positional relationship between the position of the slot pair 200 of the slot plate 20 and the recess 167 of the dielectric window 16, it is important to make the positional relationship between the components after the maintenance be as close to the plasma state before the maintenance as possible.

However, it is difficult to determine whether the positional relationship of the components after the maintenance is close to the positional relationship of the components before the maintenance just by naked eyes. Thus, a processing upon the processing target object W is actually performed, and then, it is investigated whether a difference between processing results before and after the maintenance is within a tolerance range. Through this investigation, it is determined whether the positional relationship of the components after the maintenance is close to the positional relationship of the components before the maintenance. However, it takes time to disassemble and re-assemble the plasma processing apparatus 10 as this disassembling and re-assembling are performed manually. Further, since a time-consuming pretreatment such as evacuation or temperature control is required to perform the processing upon the processing target object W, it takes time until the processing result is obtained. Thus, as the processing upon the processing target object W and the re-assembly of the processing apparatus are repeated, it takes time to return to a normal processing mode after the maintenance. As a result, the processing is delayed, and a throughput of the processing is decreased.

To avoid this problem, in the present exemplary embodiment, information upon the positional relationship of each component of the plasma processing apparatus 10 after the maintenance is obtained, and the obtained positional relationship of each component is compared with a reference positional relationship of the corresponding component of the plasma processing apparatus 10. A comparison result is outputted. For example, information upon the positional relationship of each component of the plasma processing apparatus 10 before the maintenance is obtained, and the information upon the positional relationship of each component of the plasma processing apparatus 10 after the maintenance is obtained. A position and a direction of each component of the plasma processing apparatus 10 before the maintenance is used as a reference, and it is determined whether a position and a direction of each component of the plasma processing apparatus 10 after the maintenance is within the tolerance ranges. A determination result is outputted.

If deviations of the position and the direction of the component is out of the tolerance ranges, the user of the plasma processing apparatus 10 re-assembles the plasma processing apparatus 10. Accordingly, even if the processing on the processing target object W is not actually performed, a mounting error of the plasma processing apparatus 10 can be detected, and a return to the normal processing mode after the maintenance can be achieved earlier.

[Configuration of Informing Apparatus 70]

Figure 10:
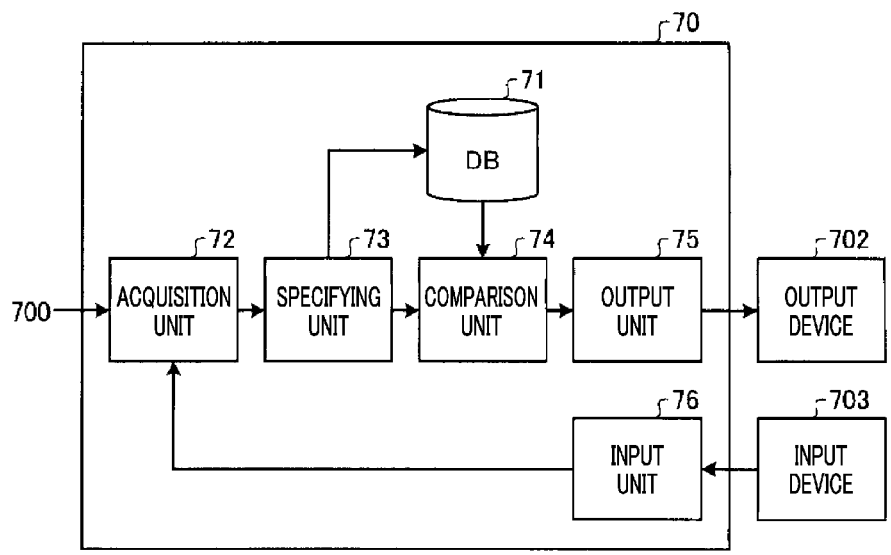
FIG. 10 is a block diagram illustrating an example of an informing apparatus.

FIG. 10 is a block diagram illustrating an example of the informing apparatus 70. The informing apparatus 70 includes a database DB 71, an acquisition unit 72, a specifying unit 73, a comparison unit 74, an output unit 75 and an input unit 76. The specifying unit 73 is an example of a first specifying unit.

By way of non-limiting example, the informing apparatus 70 is implemented by a computer having a memory, a processor and an input/output interface. Data and programs for implementing the DB 71, the acquisition unit 72, the specifying unit 73, the comparison unit 74, the output unit 75 and the input unit 76 are stored in the memory. The processor reads out these programs from the memory and executes the programs, thus implementing functions of the acquisition unit 72, the specifying unit 73, the comparison unit 74, the output unit 75 and the input unit 76. Further, the processor acquires data from the 3D scanner 700 and an input device 703, and outputs the acquired data to an output device 702 via the input/output interface.

Figure 11:
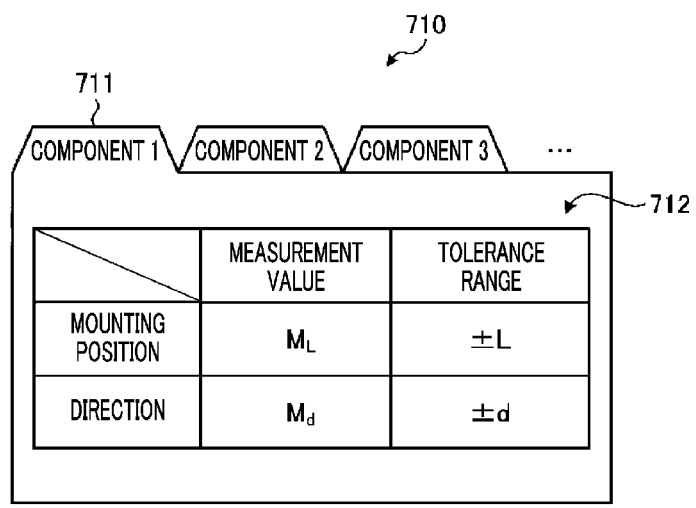
FIG. 11 is a diagram illustrating an example of a table stored in a database (DB)

The DB 71 is configured to store therein a table 710 as illustrated in FIG. 11, for example. FIG. 11 is a diagram illustrating an example of the table 710 stored in the DB 71. In the table 710, an individual table 712 is stored for each component ID 711 identifying each component mounted to the apparatus main body 11. Each individual table 712 stores therein measurement values of the position and the direction of the corresponding component and information upon tolerance ranges therefor. The tolerance ranges are relative values with respect to the measurement values. In each individual table 712, the measurement values of the position and the direction of the component are stored by the specifying unit 73 to be described later, and the tolerance ranges are previously set by a manager of the informing apparatus 70 or the like.

Further, data indicating a shape of each of the components mounted to the apparatus main body 11 (hereinafter, referred to as "shape data") is previously stored in the DB 71 by the manager of the informing apparatus 70 or the like. The data indicating the shape of the component is, for example, CAD (Computer Aided Design) data of the corresponding component. In the present exemplary embodiment, the position of each component refers to a position of a center of the component, a position of a characteristic portion of the component, a position of a marker formed at an outer surface of the component, or the like. The direction of each component is specified based on a direction of the characteristic portion of the corresponding component, a direction of the marker formed at the outer surface of the component, or the like.

The input unit 76 is configured to receive an input manipulation from the user via the input device 703 such as a touch panel or a keyboard, and outputs information inputted through the input manipulation to the acquisition unit 72. The input manipulation is a manipulation through which, for example, a first acquisition instruction, a second acquisition instruction, and so forth are inputted.

In response to the first acquisition instruction outputted from the input unit 76, the acquisition unit 72 acquires three-dimensional scan data from the 3D scanner 700 via the cable 701, and outputs the acquired scan data to the specifying unit 73 along with information indicating the first acquisition instruction. The three-dimensional scan data acquired in response to the first acquisition instruction outputted from the input unit 76 is an example of a second appearance data. Further, in response to the second acquisition instruction outputted from the input unit 76, the acquisition unit 72 acquires three-dimensional scan data from the 3D scanner 700 via the cable 701, and outputs the acquired scan data to the specifying unit 73 along with information indicating the second acquisition instruction. The three-dimensional scan data obtained in response to the second acquisition instruction outputted from the input unit 76 is an example of a first appearance data.

If the first acquisition instruction is outputted from the acquisition unit 72 along with the scan data, the specifying unit 73 identifies each of the individual components from the scan data based on the shape data of the components previously stored in the DB 71. Then, based on a mounting position and a direction of a previously set component as a reference, the specifying unit 73 specifies a mounting position and a direction of each component identified from the scan data. Then, the specifying unit 73 stores information upon the specified mounting position and the specified direction of each component in the table 710 within the DB 71.

Further, if the second acquisition instruction is outputted from the acquisition unit 72 along with the scan data, the specifying unit 73 identifies each of the individual components from the scan data based on the shape data of the components previously stored in the DB 71. Then, based on the mounting position and the direction of the previously set component as the reference, the specifying unit 73 specifies the mounting position and the direction of each component identified from the scan data. The component as the reference for the mounting position and the direction is, for example, the processing vessel 2. Then, the specifying unit 73 outputs information upon the specified mounting position and direction of each component to the comparison unit 74.

Figure 12:
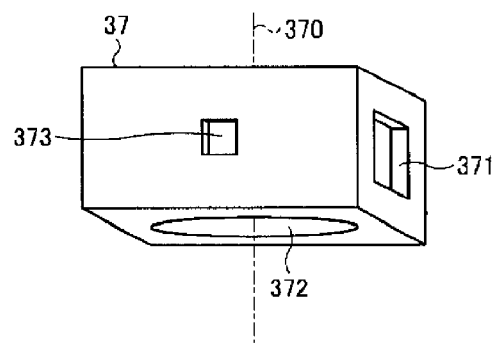
FIG. 12 is a perspective view illustrating an example appearance of a component at which a marker is formed.

In the present exemplary embodiment, the marker is formed at the outer surface of each component constituting the apparatus main body 11. FIG. 12 is a perspective view illustrating an example appearance of the component at which a marker 373 is formed. FIG. 12 shows the mode converter 37 as an example of the component at which the marker is formed. The rectangular waveguide 36 is connected to an opening 371 of the mode converter 37, and the coaxial waveguide 30 is connected to an opening 372 of the mode converter 37. A central axis of the opening 372 is defined as a central axis 370. The marker 373 is formed at the outer surface of the mode converter 37.

Figure 13:
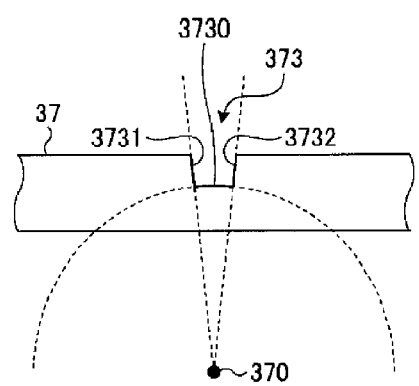
FIG. 13 is a cross sectional view illustrating an example shape of the marker.
Figure 14:
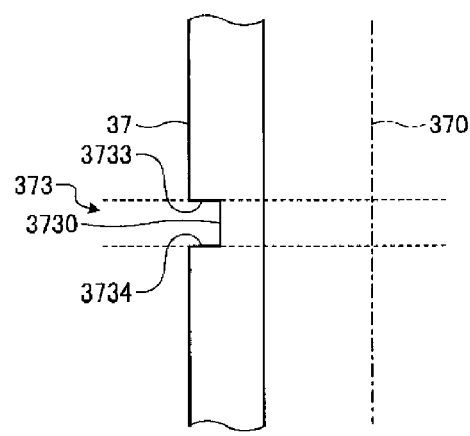
FIG. 14 is a cross sectional view illustrating another example shape of the marker.

FIG. 13 and FIG. 14 are cross sectional views illustrating an example shape of the marker 373. The marker 373 is a recess formed at the outer surface of the mode converter 37. A bottom surface 3730 of the marker 373 belongs to a cylindrical surface centered around the central axis 370 of the opening 372. A side surface 3731 of the marker 373 belongs to a plane including the central axis 370 of the opening 372, and a side surface 3732 of the marker 373 belongs to another plane including the central axis 370 of the opening 372. A side surface 3733 of the marker 373 belongs to a plane which intersects with the central axis 370 of the opening 372 at a right angle. A side surface 3734 of the marker 373 belongs to another plane which intersects with the central axis 370 of the opening 372 at a right angle.

Here, if there is a deviation between a central axis of the coaxial waveguide 30 and the central axis 370 of the opening 372 to which the coaxial waveguide 30 is connected, the microwave propagated through the coaxial waveguide 30 may be deflected, resulting in non-uniform distribution of the plasma generated in the processing space S. In view of this, it is important to accurately align the central axis of the coaxial waveguide 30 and the central axis 370 of the opening 372 to which the coaxial waveguide 30 is connected. Once the mode converter 37 is mounted, however, it is difficult to observe the position and the direction of the central axis 370 of the opening 370 from the outside.

As a resolution, in the present exemplary embodiment, the mark 373 as illustrated in FIG. 12 to FIG. 14 is formed at the mode converter 37. By specifying the position and the direction of the marker 373, the position and the direction of the central axis 370 of the opening 372, which is not seen from the outside once the mode converter 37 is mounted, can be specified. Accordingly, it is possible to detect, if any, the deviation between the central axis 370 of the opening 372 and the central axis of the coaxial waveguide 30 with high accuracy.

As stated above, in the present exemplary embodiment, as the marker serving as the reference of the position and the direction in the design is formed at the outer surface of each component constituting the apparatus main body 11, even the deviation of the position and the direction within the component can be detected from the appearance of each component.

Figure 15:
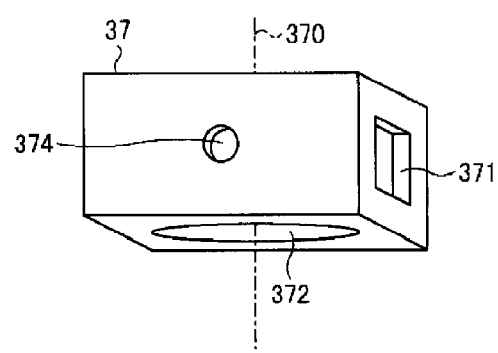
FIG. 15 is a perspective view illustrating another example appearance of the component at which the marker is formed.
Figure 16:
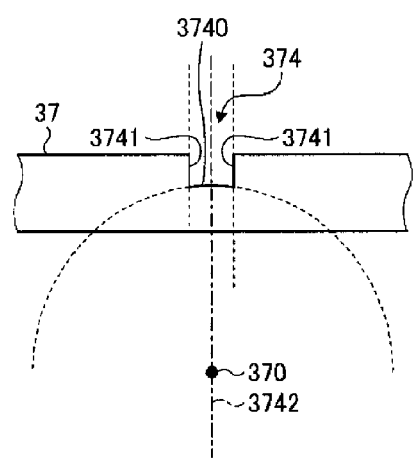
FIG. 16 is a cross sectional view illustrating still another example shape of the marker.

Further, the marker 373 may be a marker 374 having a shape as illustrated in FIG. 15 and FIG. 16, for example. FIG. 15 is a perspective view illustrating another example appearance of the component at which the marker 374 is formed. FIG. 16 is a cross sectional view illustrating another example shape of the marker 374. The marker 374 shown in FIG. 15 and FIG. 16 has a cylindrical side surface 3741.

A bottom surface 3740 of the marker 374 belongs to a cylindrical surface centered around the central axis 370 of the opening 372. The side surface 3741 of the marker 374 belongs to a cylindrical surface centered around a straight line 3742 which intersects with the central axis 370 of the opening 372 at a right angle. With this marker 374 as well, the deviation of the position and the direction within the component can be detected from the outside.

Referring back to FIG. 10, if the information regarding the mounting position and the direction of each component is outputted from the specifying unit 73, the comparison unit 74 makes a determination upon whether the mounting position and the direction of each component outputted from the specifying unit 73 fall within the tolerance ranges based on the table 710 within the DB 71. Then, the comparison unit 74 outputs a determination result to the output unit 75. The output unit 75 outputs the determination result received from the comparison unit 74 to the output device 702 such as a display or the like.

In the present exemplary embodiment, if the mounting position and the direction of each component outputted from the specifying unit 73 are both within the tolerance ranges, the comparison unit 74 outputs to the output unit 75 a determination result indicating that the mounting state is good. Meanwhile, if at least one of the mounting position and the direction of each component outputted from the specifying unit 73 is out of the tolerance range, the comparison unit 74 outputs to the output unit 75 a determination result indicating that the mounting state is not good.

As another example, the comparison unit 74 may output, in addition to the determination result, information indicating a degree of deviations of the position and the direction of each component from the tolerance ranges. In this case, the output unit 75 may output, in addition to the determination result, to the output unit 702 the information indicating the degree of the deviations from the tolerance ranges in the form of numerical values for each component. An image having a color or concentration according to the degree of the deviations may be displayed on the output device 702. Accordingly, the user can easily recognize visually which component is deviated, in which direction the component is deviated and how much the component is deviated.

As another example, the comparison unit 74 may output, in addition to the determination result, information indicating the degree of the deviations of the position and the direction of each component from the tolerance ranges in the largest order of a ratio of the degree of the deviations of the position and the direction of each component with respect to the tolerance ranges for preset number of components. By way of example, assume that, in two components A and B, the tolerance range of the mounting position of the component A is, for example, ±0.5 mm and the tolerance range of the mounting position of the component B is, for example, ±0.3 mm. Also, assume that the deviations of the mounting positions of the two components are both 0.6 mm. In this case, the ratio of the degree of the deviation of the mounting position of the component B from the tolerance range is larger than the ratio of the component A. Thus, the component B is preferentially outputted as the component having the large deviation. Accordingly, the user can be informed of the component the position of which needs to be first corrected when the apparatus main body 11 is re-assembled.

[Mounting State Informing Method]

Figure 17:
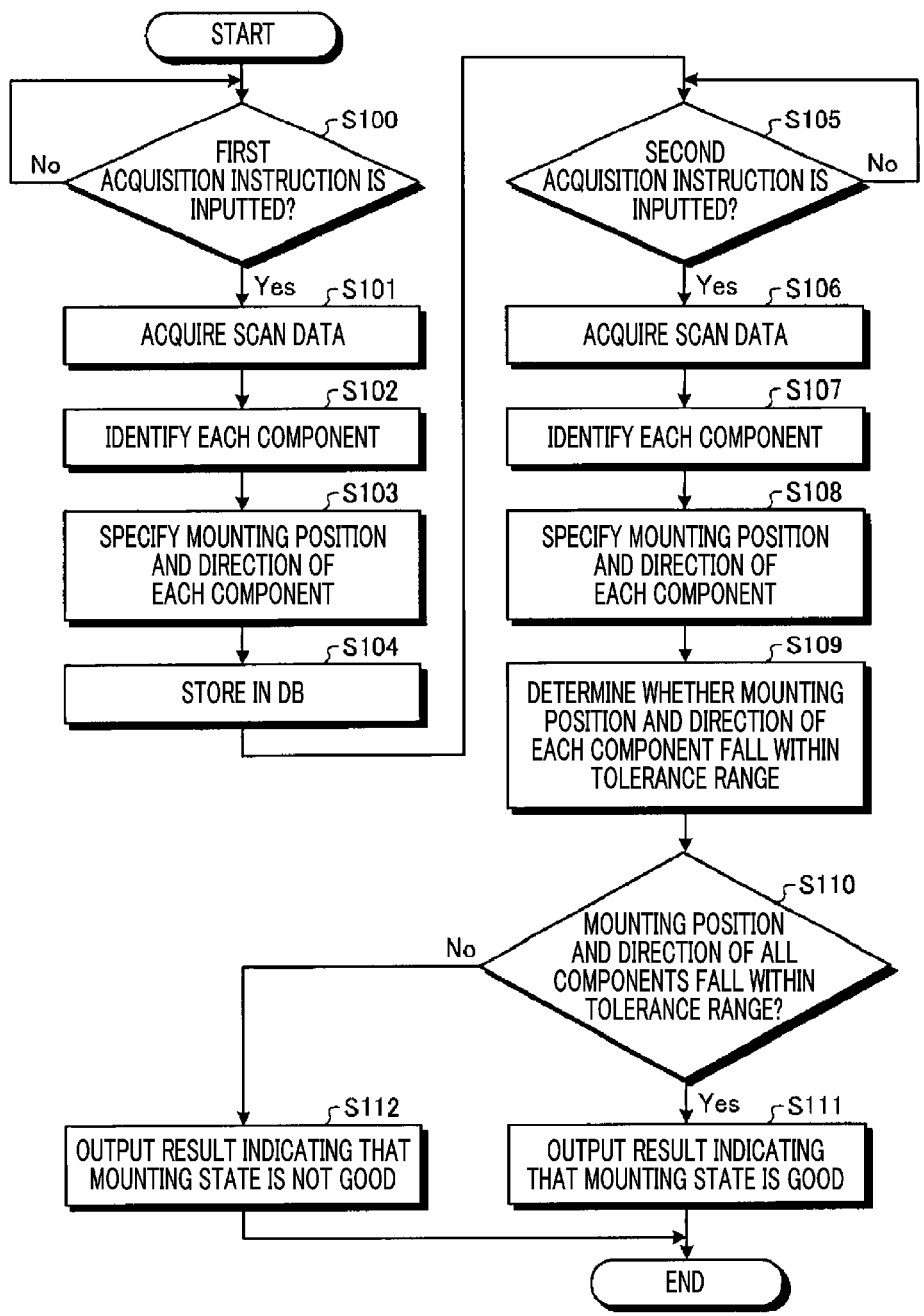
FIG. 17 is a flowchart illustrating an example of a processing performed by the informing apparatus.

FIG. 17 is a flowchart illustrating an example of a processing performed by the informing apparatus 70. For example, the processing shown in the flowchart of FIG. 17 is performed before the apparatus main body 11 is disassembled in the maintenance of the apparatus main body 11.

First, the input unit 76 determines whether the first acquisition instruction is inputted from the user via the input device 703 (S100). For example, the user may input the first acquisition instruction to the informing apparatus 70 through the input device 703 before the apparatus main body 11 is disassembled in the maintenance of the apparatus main body 11.

If the first acquisition instruction is found not to be inputted (S100: No), the input unit 76 performs the processing of the process S100, again. Meanwhile, if the first acquisition instruction is inputted (S100: Yes), the input unit 76 outputs the first acquisition instruction to the acquisition unit 72.

The user moves the 3D scanner 700 on a surface of the apparatus main body 11 before the maintenance, thus allowing the 3D scanner 700 to scan the surface of the apparatus main body 11. The acquisition unit 72 acquires three-dimensional scan data from the 3D scanner 700 via the cable 701 (S101). Then, the acquisition unit 72 outputs the obtained scan data to the specifying unit 73 along with information indicating the first acquisition instruction.

Subsequently, based on the shape data of the individual components stored in the DB 71 in advance, the specifying unit 73 identifies each of the individual components from the scan data outputted from the acquisition unit 72 (S102). Then, based on a mounting position and a direction of a previously set component as a reference, the specifying unit 73 specifies a mounting position and a direction of each component which is identified from the scan data (S103).

Then, the specifying unit 73 stores the specified mounting position and the specified direction of each component in the table 710 within the DB 71 (S104).

Thereafter, the input unit 76 determines whether a second acquisition instruction is inputted from the user through the input device 703 (S105). The user disassembles the apparatus main body 11, and cleans or replaces the component(s) of the apparatus main body 11. Then, after re-assembling the apparatus main body 11, the user inputs the second acquisition instruction to the informing apparatus 70 through the input device 703.

If the second acquisition instruction is not inputted (S105: No), the input unit 76 performs the processing of the process S105, again. Meanwhile, if the second acquisition instruction is inputted (S105: Yes), the input unit 76 outputs the second acquisition instruction to the acquisition unit 72.

The user moves the 3D scanner 700 on the surface of the apparatus main body 11 after the maintenance, thus allowing the 3D scanner 700 to scan the surface of the apparatus main body 11. The acquisition unit 72 acquires three-dimensional scan data from the 3D scanner 700 via the cable 701 (S106). Then, the acquisition unit 72 outputs the obtained scan data to the specifying unit 73 along with information indicating the second acquisition instruction.

Thereafter, based on the shape data of the individual components previously stored in the DB 71, the specifying unit 73 identifies each of the individual components from the scan data outputted from the acquisition unit 72 (S107). Then, based on the mounting position and the direction of the previously set component as the reference, the specifying unit 73 specifies the mounting position and the direction of each component which is identified from the scan data (S108). Then, the specifying unit 73 outputs the specified mounting position and the specified direction of each component to the comparison unit 74.

Subsequently, by referring to the table 710 within the DB 71 for each component, the comparison unit 74 determines whether the mounting positions and the directions of all the components specified by the specifying unit 73 fall within the tolerance ranges (S110). If the mounting positions and the directions of all the components are within the tolerance ranges (S110: Yes), the comparison unit 74 outputs to the output unit 75 a comparison result indicating that the mounting state is good (S111). The output unit 75 outputs the comparison result outputted from the comparison unit 74 to the output device 702 such as the display. Then, the mounting state informing method shown in the present flowchart is ended.

Meanwhile, if the mounting position and the direction of at least a part of the components fall out of the tolerance ranges (S110: No), the comparison unit 74 outputs to the output unit 75 a comparison result indicating that the mounting state is not good (S112). The output unit 75 outputs the comparison result outputted from the comparison unit 74 to the output device 702 such as the display. Then, the mounting state informing method shown in the present flowchart is ended.

So far, the first exemplary embodiment has been described. The informing apparatus 70 in the present exemplary embodiment is equipped with the DB 71, the acquisition unit 72, the specifying unit 73, the comparison unit 74 and the output unit 75. The DB 71 stores therein the information upon the mounting position and the direction of each of the multiple components belonging to the plasma processing apparatus 10. The acquisition unit 72 acquires the scan data indicating the state of the appearance of the plasma processing apparatus 10, which is produced by the 3D scanner 700. The specifying unit 73 identifies the multiple components belonging to the plasma processing apparatus 10 based on the scan data, and specifies the mounting position and the direction of each identified component. The comparison unit 74 compares the mounting position and the direction of each identified component with the information upon the mounting positions and the directions stored in the DB 71. The output unit 75 outputs the comparison result obtained by the comparison unit 74. Accordingly, without needing to perform a processing upon the processing target object W after the maintenance, the mounting error of the plasma processing apparatus 10 can be detected. Therefore, a throughput of the processing can be improved.

Further, in the above-described exemplary embodiment, the information upon the tolerance ranges of the mounting position and the direction of each component is stored in the DB 71. The comparison unit 74 compares the mounting position and the direction of each identified component with the tolerance ranges of the mounting position and the direction stored in the DB 71. The output unit 75 outputs, as the comparison result, the information indicating whether the mounting positions and the directions of all the identified components fall within the tolerance ranges stored in the DB 71. Accordingly, the user can rapidly find out whether there exists a component the mounting position and the direction of which fall out of the tolerance ranges. Thus, the user can make a rapid decision on whether to re-assemble the plasma processing apparatus 10.

Furthermore, in the present exemplary embodiment, if there is, in the identified components, a component having the mounting position and the direction which fall out of the tolerance ranges stored in the DB 71, the output unit 75 may further output degree of deviations of the mounting position and the direction from the tolerance ranges of the corresponding component. Accordingly, the user can be informed of how much the corresponding component, whose mounting position and direction fall out of the tolerance range, deviates.

Besides, in the present exemplary embodiment, the output unit 75 may output, for a preset number of components, the degree of the deviations of the mounting positions and the directions from the tolerance ranges in the largest order of the ratio of the degree of the deviations of the mounting positions and the directions from the tolerance ranges. Accordingly, the user can correct the mounting position and the direction of the component having the largest deviation preferentially.

Moreover, in the present exemplary embodiment, the acquisition unit 72 acquires the scan data, which are obtained by the 3D scanner 700 and which indicate the state of the appearance of the apparatus main body 11 in a preset state. The specifying unit 73 identifies each of the individual components belonging to the apparatus main body 11 based on the scan data obtained by the acquisition unit 72; specifies the mounting position and the direction of each of the identified components; and stores the information upon the specified mounting position and direction of each component in the DB 71. Accordingly, the deviation of the mounting position and the direction of each component of the apparatus main body 11 after the maintenance can be detected by using the mounting position and the direction of each component of the apparatus main body 11 before the maintenance as the reference.

In addition, in the present exemplary embodiment, the marker 373 is formed at the outer surface of the component. The specifying unit 73 specifies the mounting position and the direction of each identified component by using the position and the direction of the marker 373. Accordingly, the specifying unit 73 is capable of specifying the mounting position and the direction of each component with high accuracy.

Further, in the above-described exemplary embodiment, the marker 373 has the bottom surface 3730 belonging to the cylindrical surface centered around the axis in the design. Accordingly, in the apparatus main body 11 in the assembled state, even if the axis in the design is not seen from the outside of the apparatus main body 11, the position and the direction of this axis in the design can be specified based on the position and the direction of the marker 373 which are obtained by the 3D scanner 700.

Furthermore, in the above-described exemplary embodiment, the marker 373 has at least one of the side surfaces 3731 and 3732 belonging to the planes including the axis in the design or the side surfaces 3733 and 3734 belonging to the planes perpendicularly intersecting with the axis in the design. Accordingly, in the apparatus main body 11 in the assembled state, even if the axis in the design is not seen from the outside of the apparatus main body 11, the position and the direction of this axis in the design can be specified based on the position and the direction of the marker 373 which are obtained by the 3D scanner 700.

In addition, in the above-described exemplary embodiment, the marker 374 having the side surface 3741 belonging to the cylindrical outer surface centered around the straight line which perpendicularly intersects with the axis in the design may be formed at each component. Accordingly, in the apparatus main body 11 in the assembled state, even if the axis in the design is not seen from the outside of the apparatus main body 11, the position and the direction of this axis in the design can be specified based on the position and the direction of the marker 374 which are obtained by the 3D scanner 700.

Second Exemplary Embodiment

In the processing system 1 according to the first exemplary embodiment, the values of the tolerance ranges stored in the DB 71 of the informing apparatus 70 are previously set by the manager of the processing system 1 or the like. Meanwhile, in a processing system 1 according to a second exemplary embodiment, data of the mounting positions and the directions of the components of the multiple plasma processing apparatuses 10 and the processing results thereof are obtained, and the tolerance ranges of the mounting positions and the directions of the components in which fine processing results are obtained are specified based on the collected information. Further, in the first exemplary embodiment, it is investigated whether the mounting position and the direction of each component belonging to the plasma processing apparatus 10 after the maintenance fall within the tolerance ranges with respect to the mounting position and the direction of each component of the plasma processing apparatus 10 at the preset timing, for example, before the maintenance. Meanwhile, in the second exemplary embodiment, it is investigated whether the mounting position and the direction of each component belonging to the plasma processing apparatus 10 after the maintenance fall within tolerance ranges specified based on distributions of the mounting positions and the directions of the components belonging to the multiple plasma processing apparatuses 10.

[Configuration of Processing System 1]

Figure 18:
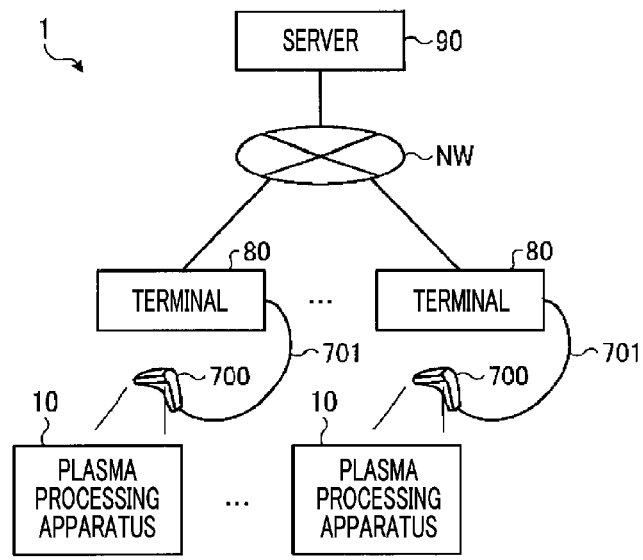
FIG. 18 is a diagram illustrating an example of a processing system according to a second exemplary embodiment.

FIG. 18 is a diagram illustrating an example of the processing system 1 according to the second exemplary embodiment. The processing system 1 in the second exemplary embodiment is equipped with the plurality of plasma processing apparatuses 10, a plurality of terminals 80 and a server 90. The plasma processing apparatuses 10 are all of a same kind. The plasma processing apparatuses of the same kind imply that these plasma processing apparatuses are manufactured by the same manufacturer and have the same series, same product numbers, and so forth. Further, in FIG. 18, parts assigned same reference numerals as those of FIG. 1 have the same configuration and similar functions as those of FIG. 1. Thus, redundant description thereof will be omitted.

Each terminal 80 is connected to the 3D scanner 700 via the cable 701. Each terminal 80 transmits scan data obtained by the 3D scanner 700 to the server 90 through a communication network NW. Then, the terminal 80 outputs a determination result upon a mounting state, which is received from the server 90, to the monitor or the like.

Based on the scan data received from each terminal 80, the server 90 specifies tolerance ranges of the mounting position and the direction of each component of the plasma processing apparatus 10. Then, the server 90 makes a determination upon whether the mounting position and the direction of each component specified from the scan data sent from each terminal 80 fall within the specified tolerance ranges, and sends a determination result to the terminal 80. The server 90 is an example of the mounting state informing apparatus.

[Configuration of Terminal 80]

Figure 19:
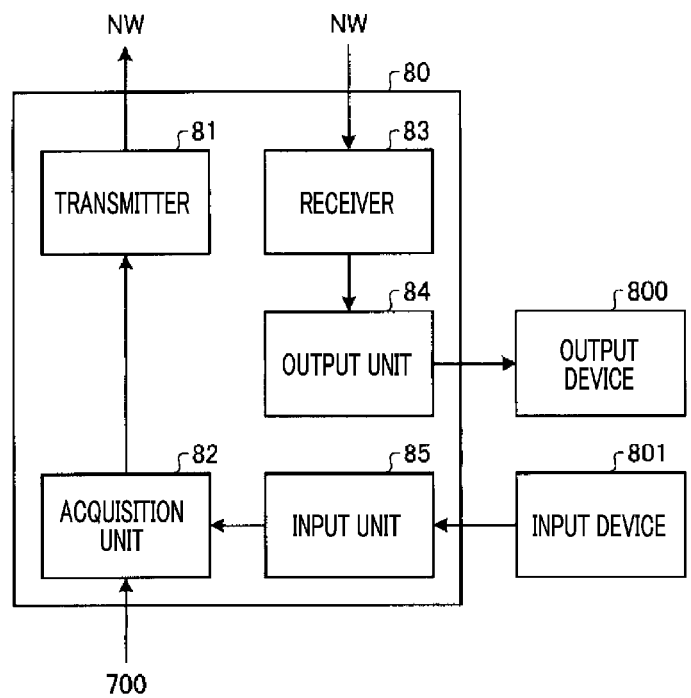
FIG. 19 is a block diagram illustrating an example of a terminal.

FIG. 19 is a block diagram illustrating an example of the terminal 80. The terminal 80 is equipped with a transmitter 81, an acquisition unit 82, a receiver 83, an output unit 84 and an input unit 85.

The input unit 85 is configured to receive an input manipulation from the user through an input device 801 such as a touch panel or a keypad, and output information inputted by the input manipulation to the acquisition unit 82. The input manipulation is a manipulation for inputting, for example, a third acquisition instruction, a fourth acquisition instruction, a processing result, and so forth. The processing result is information indicating whether a result of a processing on the processing target object W performed in the plasma processing apparatus 10 satisfies a preset criterion. The processing result indicates OK when the preset criterion is satisfied, whereas the processing result indicates NG when the preset criterion is not met.

If the third acquisition instruction and the processing result are outputted from the input unit 85, the acquisition unit 82 is configured to acquire three-dimensional scan data from the 3D scanner 700 via the cable 701. Then, the acquisition unit 82 is configured to create a registration request including the acquired scan data and the processing result, and outputs the created registration request to the transmitter 81. Further, if the fourth acquisition instruction is outputted from the input unit 85, the acquisition unit 82 is configured to acquire three-dimensional scan data from the 3D scanner 700 via the cable 701. Then, the acquisition unit 82 is configured to create a determination request including the acquired scan data, and output the created determination request to the transmitter 81.

The transmitter 81 is configured to transmit the registration request and the determination request outputted from the acquisition unit 82 to the server 90 via the communication network NW. When the determination result is received from the server 90 via the communication network NW, the receiver 83 is configured to output the received determination result to the output unit 84. The output unit 84 is configured to output the determination result from the receiver 83 to an output device 800 such as a display or the like.

[Configuration of Server 90]

Figure 20:
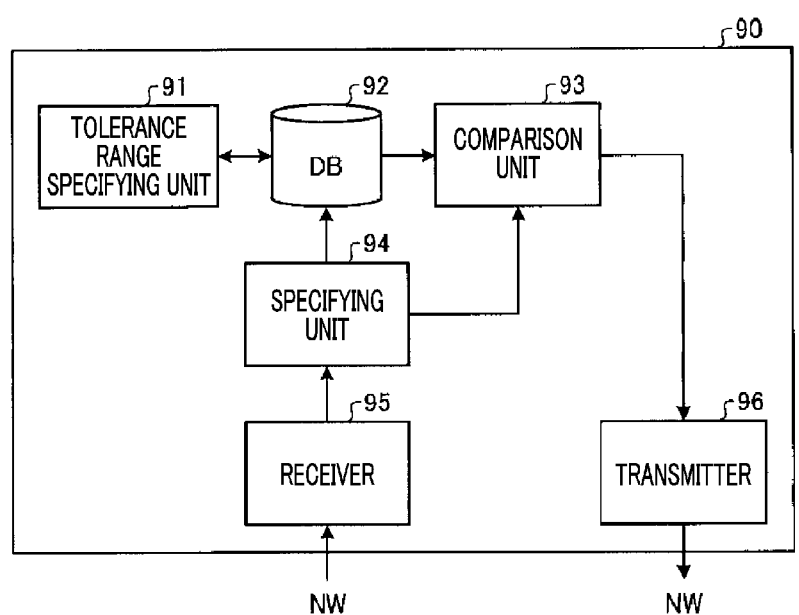
FIG. 20 is a block diagram illustrating an example of a server.

FIG. 20 is a block diagram illustrating an example of the server 90. The server 90 has a tolerance range specifying unit 91, a DB 92, a comparison unit 93, a specifying unit 94, a receiver 95 and a transmitter 96. The receiver 95 is an example of an acquisition unit; the specifying unit 94, an example of a first specifying unit; and the tolerance range specifying unit 91, an example of a second specifying unit.

Figure 21:
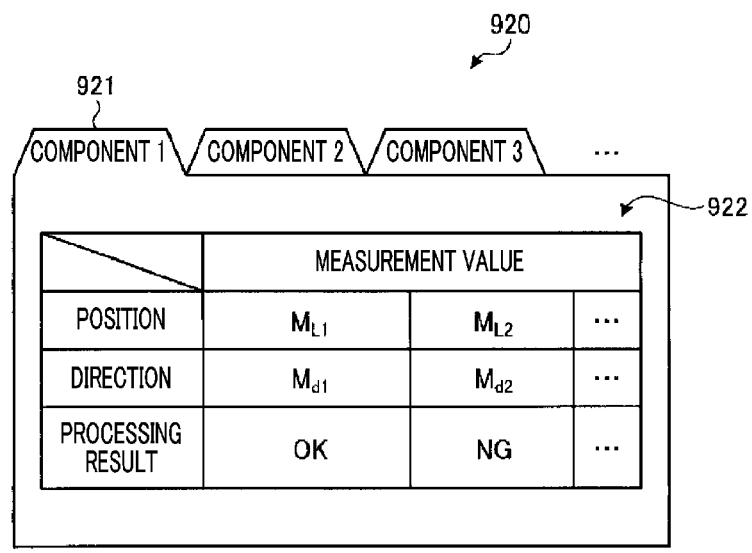
FIG. 21 is a diagram illustrating an example of a measurement table.
Figure 22:
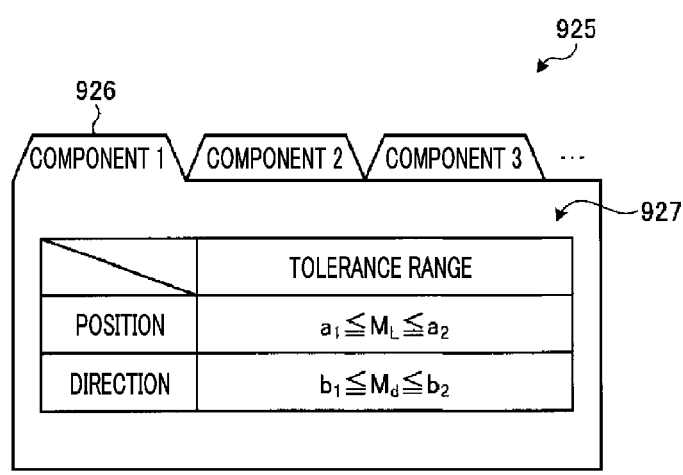
FIG. 22 is a diagram illustrating an example of a tolerance range table.

The DB 92 stores therein a measurement table 920 as illustrated in FIG. 21, for example, and a tolerance range table 925 as illustrated in FIG. 22, for example. FIG. 21 is a diagram illustrating an example of the measurement table 920. FIG. 22 is a diagram illustrating an example of the tolerance range table 925.

In the measurement table 920, an individual table 922 is stored for each component ID 921 which identifies each component mounted to the apparatus main bodies 11 belonging to the plasma processing apparatuses 10 of the same kind. Each individual table 922 stores therein measurement values of the mounting position and the direction of the component and the processing result obtained when the mounting position and the direction of the component are as specified therein.

In the tolerance range table 925, an individual table 927 is stored for each component ID 926 which identifies each component mounted to the apparatus main bodies 11 belonging to the plasma processing apparatuses 10 of the same kind. Each individual table 927 stores therein information upon the tolerance ranges of the mounting position and the direction of the component.

Further, information indicating shapes of the individual components mounted to the apparatus main body 11 is previously stored in the DB 92 by a manager of the server 90 or the like.

The receiver 95 is configured to receive the registration requests and the determination requests sent from the terminals 80 via the communication networks NW, and output the received registration requests and the determination requests to the specifying unit 94.

In response to the registration request outputted from the receiver 95, the specifying unit 94 identifies each of the individual components from the scan data included in the registration request based on the shape data of the components, which are previously stored in the DB 92. Then, by using a mounting position and a direction of a previously set component as reference, the specifying unit 94 specifies the mounting position and the direction of each component identified from the scan data. Then, the specifying unit 94 stores the information of the specified mounting position and direction of each component in the measurement table 920 within the DB 92 along with the processing result included in the registration request.

Furthermore, in response to the determination request outputted from the receiver 95, the specifying unit 94 identifies each of the individual components from the scan data included in the determination request based on the shape data of the components, which are previously stored in the DB 92. Then, by using a mounting position and a direction of a previously set component as a reference, the specifying unit 94 specifies the mounting position and the direction of each component identified from the scan data. Then, the specifying unit 94 outputs the information of the specified mounting position and the specified direction of each component to the comparison unit 93.

If the information indicating the mounting position and the direction of each component is outputted from the specifying unit 94, the comparison unit 93 determines whether the mounting position and the direction of each component, which are outputted from the specifying unit 94, fall within the tolerance ranges by referring to the tolerance range table 925 within the DB 92 for each component. Then, the comparison unit 93 outputs a determination result to the transmitter 96. The transmitter 96 transmits via the communication network NW the determination result from the comparison unit 93 to the terminal 80 which is a transmitting source of the determination request.

By referring to the measurement table 920 at every preset timing, the tolerance range specifying unit 91 specifies the tolerance ranges of the mounting position and the direction of each component, and updates the tolerance ranges stored in the tolerance range table 925 within a specified tolerance range. By way of example, the tolerance range specifying unit 91 extracts measurement values of the mounting position and the direction of each component corresponding to the processing result of OK from the individual table 922. Then, the tolerance range specifying unit 91 specifies a range including the extracted measurement value as the tolerance range for each component. Further, the tolerance range specifying unit 91 may specify, as the tolerance range, a range of $\pm 3\sigma$ in a distribution of the extracted measurement value of each component. Here, '$\sigma$' denotes a standard deviation in the distribution of the extracted measurement value.

[Processing of Terminal 80]

Figure 23:
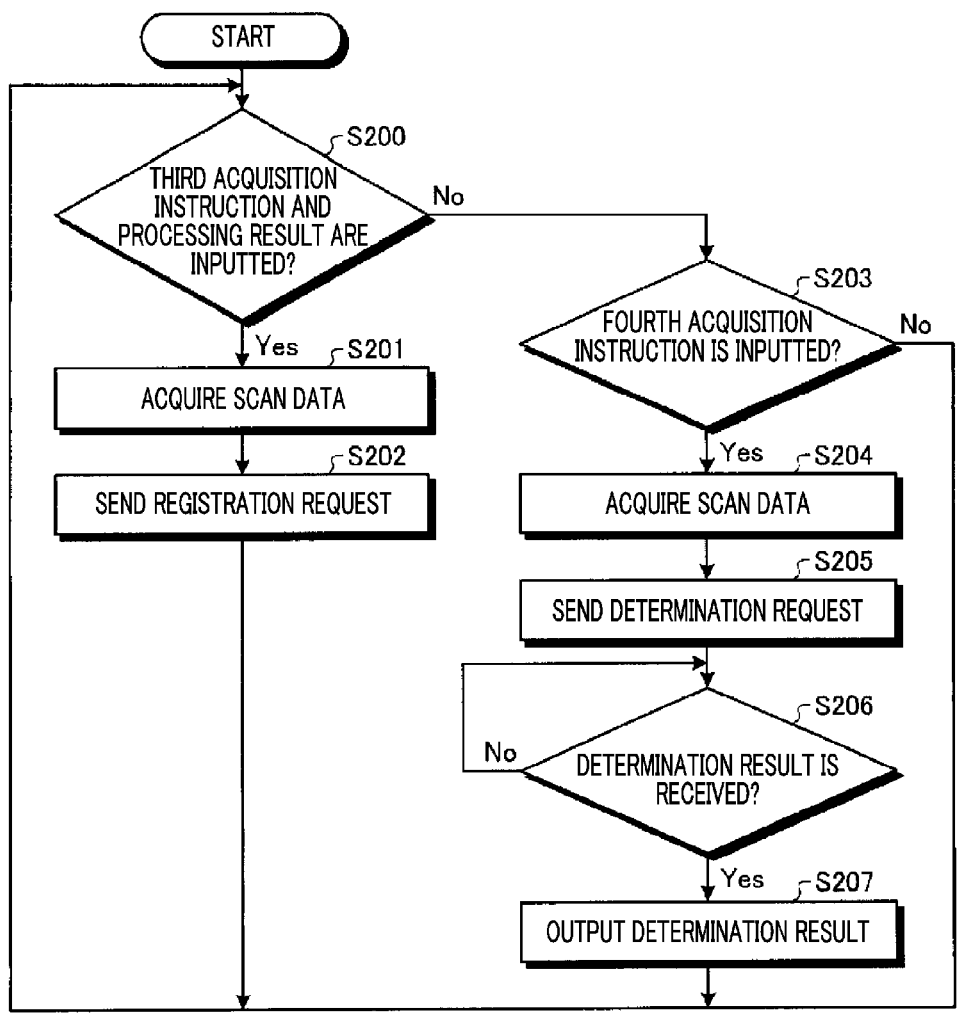
FIG. 23 is a flowchart illustrating an example of a processing performed by the terminal.

FIG. 23 is a flowchart illustrating an example processing of the terminal 80.

First, the input unit 85 determines whether the third acquisition instruction and the processing result are inputted from the user through the input device 801 (S200). The user of the plasma processing apparatus 10 inputs, at every preset timing, the third acquisition instruction and the processing result by the plasma processing apparatus 10 to the terminal 80 through the input device 801.

If the third acquisition instruction and the processing result are found to be inputted (S200: Yes), the input unit 85 outputs the third acquisition instruction and the processing result to the acquisition unit 82. The user moves the 3D scanner 700 on the surface of the apparatus main body 11, thus allowing the 3D scanner 700 to scan the surface of the apparatus main body 11. The acquisition unit 82 acquires the three-dimensional scan data from the 3D scanner 700 via the cable 701 (S201).

Then, the acquisition unit 82 creates the registration request including the acquired scan data and the processing result, and outputs the created registration request to the transmitter 81. The transmitter 81 sends the registration request from the acquisition unit 82 to the server 90 via the communication network NW (S202). Then, the processing of the process S200 is performed again.

If the third acquisition instruction and the processing result are not inputted (S200: No), the input unit 85 determines whether the fourth acquisition instruction is inputted from the user through the input device 801 (S203). If the fourth acquisition instruction is not inputted (S203: No), the processing of the process S200 is performed again. The user disassembles the apparatus main body 11 for maintenance or the like, and cleans or replaces the component(s) of the apparatus main body 11. Then, after re-assembling the apparatus main body 11, the user inputs the fourth acquisition instruction to the terminal 80 through the input device 801.

If the fourth instruction is inputted (S203: Yes), the input unit 85 outputs the fourth acquisition instruction to the acquisition unit 82. The user moves the 3D scanner 700 on the surface of the apparatus main body 11 after the maintenance, thus allowing the 3D scanner 700 to scan the surface of the apparatus main body 11. The acquisition unit 82 acquires the three-dimensional scan data from the 3D scanner 700 via the cable 701 (S204). Then, the acquisition unit 82 creates the determination request including the acquired scan data, and outputs the created determination request to the transmitter 81. The transmitter 81 sends the determination request from the acquisition unit 82 to the server 90 via the communication network NW (S205).

Subsequently, the receiver 83 determines whether the determination result is received from the server 90 via the communication network NW (S206). If it is found out that the determination result is not received (S206: No), the processing of the process S206 is performed again.

Meanwhile, if the determination result is found to be received (S206: Yes), the receiver 83 outputs the received determination result to the output unit 84. The output unit 84 outputs the determination result from the receiver 83 to the output device 800 such as the display (S207). Then, the processing of the process S200 is performed again.

[Processing of Server 90]

Figure 24:
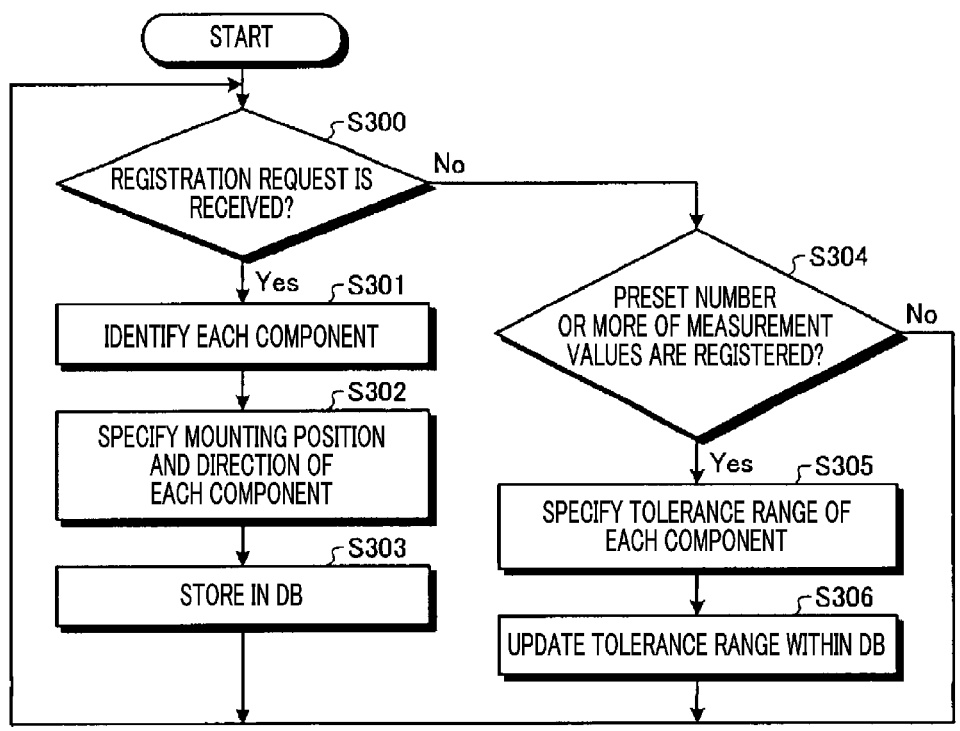
FIG. 24 is a flowchart illustrating an example of a tolerance range updating processing performed by the server.

FIG. 24 is a flowchart illustrating an example of a tolerance range updating processing performed by the server 90.

First, the specifying unit 94 determines whether the registration request has been received from the terminal 80 via the communication network NW (S300). If the registration request has been received (S300: Yes), the specifying unit 94 identifies each of the individual components from the scan data included in the registration request based on the shape data of the components previously stored in the DB 92 (S301).

Then, the specifying unit 94 specifies the mounting position and the direction of each component identified from the scan data with reference to the mounting position and the direction of the previously set component (S302). Then, the specifying unit 94 stores information upon the specified mounting position and the specified direction of each component within the measurement table 920 within the DB 92 along with the processing result included in the registration request (S303). Then, the processing described in the process S300 is performed again.

Meanwhile, if the registration request is not received (S300: No), the tolerance range specifying unit 91 determines whether a preset number or more of measurement values are registered after the tolerance range is updated the last time (S304). If the preset number or more of measurement values are not registered after the tolerance range is updated the last time (S304: No), the processing shown in the process S300 is performed again.

Meanwhile, if the preset number or more of measurement values are registered after the tolerance range is updated the last time (S304: Yes), the tolerance range specifying unit 91 specifies the tolerance range of the mounting position and the direction of each component by referring to the measurement table 920 within the DB 92 (S305). Then, the tolerance range specifying unit 91 updates the tolerance range stored in the tolerance range table 925 within the specified tolerance range (S306). Thereafter, the processing of the process S300 is performed again.

Figure 25:
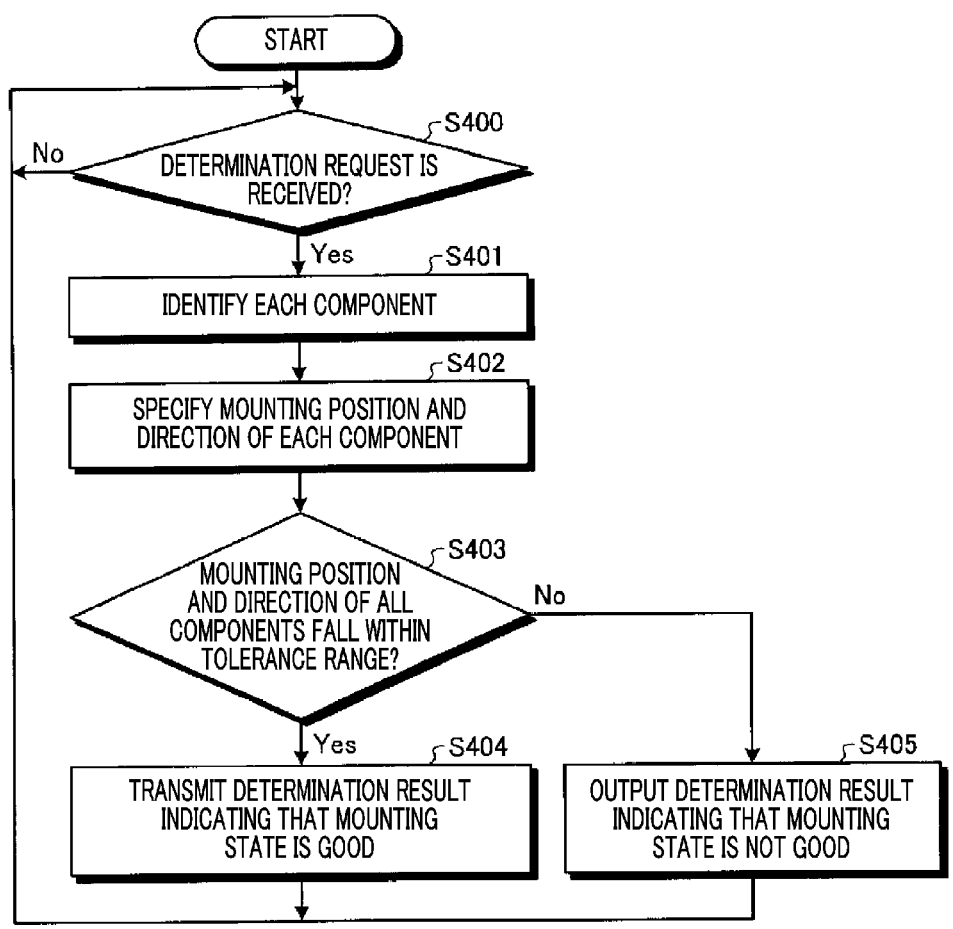
FIG. 25 is a flowchart illustrating an example of a determination processing performed by the server.

FIG. 25 is a flowchart illustrating an example of a determination processing performed by the server 90.

First, the specifying unit 94 determines whether the determination request has been received from the terminal 80 via the communication network NW (S400). If the determination request has not been received (S400: No), the processing of the process S400 is performed again.

Meanwhile, if the determination request has been received (S400: Yes), the specifying unit 94 identifies each of the individual components from the scan data included in the determination request based on the shape data of the components previously stored in the DB 92 (S401). Then, the specifying unit 94 specifies the mounting position and the direction of each component identified from the scan data with reference to the mounting position and the direction of the previously set component (S402). Then, the specifying unit 94 outputs information upon the specified mounting position and the specified direction of each component to the comparison unit 93.

Subsequently, the comparison unit 93 determines whether the mounting positions and the directions of all the components outputted from the specifying unit 94 are within the tolerance ranges by referring to the tolerance range table 925 within the DB 92 (S403). If the mounting positions and the directions of all the components are found to be within the tolerance ranges (S403: Yes), the comparison unit 93 outputs to the transmitter 96 the determination result indicating that the mounting state is fine. The transmitter 96 transmits via the communication network NW the determination result outputted from the comparison unit 93 to the terminal 80 which is the transmitting source of the determination request received in the process S400 (S404). Then, the processing of the process S400 is performed again.

Meanwhile, if the mounting position and the direction of at least a part of the components are out of the tolerance range (S403: No), the comparison unit 93 outputs to the transmitter 96 the determination result indicating that the mounting state is not fine. The transmitter 96 sends via the communication network NW the determination result from the comparison unit 93 to the terminal 80 which is the transmitting source of the determination request received in the process S400 (S405). Then, the processing of the process S400 is performed again.

So far, the second exemplary embodiment has been described. In the present exemplary embodiment, the server 90 is equipped with the tolerance range specifying unit 91, the specifying unit 94 and the receiver 95. For each of the plasma processing apparatuses 10 of the same kind, the receiver 95 collects the scan data obtained by the 3D scanner 700 along with the processing result performed by the plasma processing apparatus 10. Based on the scan data of each plasma processing apparatus 10 collected by the receiver 95, the specifying unit 94 identifies each of the individual components belonging to the plasma processing apparatus 10, and specifies the mounting position and the direction of each of the identified components. The tolerance range specifying unit 91 specifies the tolerance range of the mounting position and the direction of the component for allowing the processing result to satisfy the preset condition, and stores the specified tolerance range for each component in the DB 92. Accordingly, it is possible to specify the tolerance range of the mounting position and the direction of the component within the range in which the processing result satisfies the preset condition. Thus, the tolerance range can be suppressed from being set to be excessively wide, causing the processing result not to satisfy the preset condition. Further, the tolerance range can also be suppressed from being set to be excessively narrow, causing the reassembling of the apparatus main body 11 to be performed too frequently.

[Others]

The above-described exemplary embodiments are not limiting and can be modified in various ways without departing from the scope of the present disclosure.

For example, in the above-described exemplary embodiments, the appearance of the assembled apparatus main body 11 is scanned by the 3D scanner 700. However, the present disclosure is not limited thereto. By way of example, the apparatus main body 11 in the course of the assembly may be scanned by the 3D scanner 700. Accordingly, a deviation of a mounting position and a direction of a component, which would not be seen from the outside when the apparatus main body 11 is completely assembled, can also be investigated.

Furthermore, in the above-described exemplary embodiments, the appearance of the apparatus main body 11 which is not performing any processing is scanned by the 3D scanner 700. However, the present disclosure is not limited thereto. By way of example, the appearance of the apparatus main body 11 which is performing a processing may be scanned by the 3D scanner 700. Accordingly, a deviation of a mounting position and a direction of each component can be investigated in consideration of a deformation of the component by heat as well.

Moreover, in the above-described first exemplary embodiment, the difference in the mounting position and the direction of each component of the apparatus main body 11 after the maintenance is investigated by using the mounting position and the direction of each component of the apparatus main body 11 before the maintenance as the reference. However, the present disclosure is not limited thereto. By way of non-limiting example, the difference in the mounting position and the direction of each component of the apparatus main body 11 after the maintenance may be investigated by being compared with design data (for example, CAD data). Accordingly, characteristics of the apparatus main body 11 after the maintenance can be maintained constant regardless of characteristics of the apparatus main body 11 before the maintenance.

Further, in the above-described second exemplary embodiment, the server 90 specifies the mounting position and the direction of each component based on the scan data transmitted from each terminal 80. However, the present disclosure is not limited thereto. By way of example, each terminal 80 may specify the mounting position and the direction of each component based on the scan data obtained by the 3D scanner 700, and send the information upon the specified mounting position and direction of each component to the server 90 via the communication network NW. Accordingly, the amount of data transmitted within the communication network NW can be reduced.

Furthermore, in the above-described second exemplary embodiment, the server 90 and the terminal 80 are described as separate devices. However, the present disclosure is not limited thereto, and the server 90 and any one terminal 80 may be implemented as one device.

Further, in the plasma processing apparatus 10 according to the above-described exemplary embodiments, the microwave plasma using the RLSA as a plasma source is used. However, the present disclosure is not limited thereto. By way of non-limiting example, capacitively coupled plasma (CCP), inductively coupled plasma (ICP), electron cyclotron resonance plasma (ECP) or helicon wave plasma (HWP) may be used as the plasma source.

In addition, in the above-described exemplary embodiments, the plasma processing apparatus 10 is described as the processing apparatus. However, the present disclosure is not limited thereto, and is also applicable to an apparatus configured to perform a processing on a processing target object W without using plasma, such as a heat treatment apparatus, as long as the apparatus performs a processing on the processing target object W.

According to the exemplary embodiments, it is possible to provide the technique of informing the mounting state to thereby improve the throughput of the processing.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

We claim:

1. A mounting state informing apparatus, comprising:
   a database configured to store therein information upon a mounting position and a direction of each of multiple components belonging to a processing apparatus;
   an acquisition unit configured to acquire first appearance data indicating a state of an appearance of the processing apparatus, the first appearance data being obtained by a 3D scanner;
   a first specifying unit configured to identify the multiple components belonging to the processing apparatus based on the first appearance data and configured to specify a mounting position and a direction of each of the identified components;
   a comparison unit configured to compare the specified mounting position and the specified direction of each of the identified components with the information upon the mounting position and the direction of the corresponding component stored in the database; and
   an output unit configured to output to a display a comparison result obtained by the comparison unit in the form of an image having a color or concentration according to the degree of the results.

2. The mounting state informing apparatus of claim 1,
   wherein information upon tolerance ranges of the mounting position and the direction of each component is stored in the database,
   the comparison unit compares the mounting position and the direction of each of the identified components with the tolerance ranges of the mounting position and the direction stored in the database, and
   the output unit outputs, as the comparison result, information indicating whether the mounting position and the direction of each of all the identified components fall within the tolerance ranges stored in the database.

3. The mounting state informing apparatus of claim 2,
   wherein the acquisition unit collects, for each of multiple processing apparatuses of a same kind including the processing apparatus, the first appearance data obtained by the 3D scanner along with a processing result performed by the processing apparatus,
   the first specifying unit identifies the multiple components belonging to the processing apparatus based on the first appearance data of the multiple processing apparatuses collected by the acquisition unit, and specifies the mounting position and the direction of each of the identified components, and the mounting state informing apparatus further comprises a second specifying unit configured to specify tolerance ranges of the mounting position and the direction of each of the multiple components, which allow the processing result to satisfy a preset condition, and configured to store the specified tolerance ranges of each of the multiple components in the database.

4. The mounting state informing apparatus of claim 2, wherein, when there is a component, in the identified components, having the mounting position and the direction which do not fall within the tolerance ranges stored in the database, the output unit further outputs a deviation degree of the mounting position and the direction of the corresponding component with respect to the tolerance ranges.

5. The mounting state informing apparatus of claim 2, wherein the output unit outputs, for a preset number of components, a deviation degree of the mounting position and the direction with respect to the tolerance ranges in a largest order of a ratio of the deviation degree of the mounting position and the direction with respect to the tolerance ranges.

6. The mounting state informing apparatus of claim 1, wherein the information upon the mounting position and the direction stored in the database is CAD data of the processing apparatus.

7. The mounting state informing apparatus of claim 1, wherein the acquisition unit acquires second appearance data indicating a state of the appearance of the processing apparatus in a preset state, the second appearance data being obtained by the 3D scanner, and the first specifying unit identifies the multiple components belonging to the processing apparatus based on the second appearance data, specifies the mounting position and the direction of each of the identified components, and stores information upon the specified mounting position and direction of each of the components in the database.

8. The mounting state informing apparatus of claim 1, wherein a recess is formed at an outer surface of each component, and the first specifying unit specifies the mounting position and the direction of each of the identified components by using a position and a direction of the recess.

9. The mounting state informing apparatus of claim 8, wherein the recess has a bottom surface belonging to a cylindrical outer surface centered around an axis in a design.

10. The mounting state informing apparatus of claim 8, wherein the recess has at least one of a sidewall having a surface belonging to a plane including an axis in a design or a sidewall having a surface belonging to a plane intersecting with the axis in the design perpendicularly.

11. The mounting state informing apparatus of claim 8, wherein the recess has a sidewall belonging to a cylindrical outer surface centered around a straight line which intersects with an axis in a design perpendicularly.

12. The mounting state informing apparatus of claim 1, wherein the acquisition unit acquires the first appearance data obtained by the 3D scanner on the processing apparatus which is being operated.

13. The mounting state informing apparatus of claim 3, wherein when there is a component, in the identified components, having the mounting position and the direction which do not fall within the tolerance ranges stored in the database, the output unit further outputs a deviation degree of the mounting position and the direction of the corresponding component with respect to the tolerance ranges.

14. The mounting state informing apparatus of claim 13, wherein the output unit outputs, for a preset number of components, a deviation degree of the mounting position and the direction with respect to the tolerance ranges in a largest order of a ratio of the deviation degree of the mounting position and the direction with respect to the tolerance ranges.

15. The mounting state informing apparatus of claim 14, wherein the information upon the mounting position and the direction stored in the database is CAD data of the processing apparatus.

16. A mounting state informing method of informing a mounting state of multiple components mounted to a processing apparatus, the mounting state informing method comprising:
  acquiring appearance data indicating a state of an appearance of the processing apparatus, the appearance data being obtained by a 3D scanner;
  identifying the multiple components belonging to the processing apparatus based on the appearance data;
  specifying a mounting position and a direction of each of the identified components;
  comparing, by referring to a database configured to store therein information upon the mounting position and the direction of each of the multiple components belonging to the processing apparatus, the specified mounting position and the specified direction of each of the identified components with the information upon the mounting position and the direction of the corresponding component stored in the database; and
  outputting a comparison result to a display, the comparison result in the form of an image having a color or concentration according to the degree of the results.

* * * * *